(12) United States Patent
Lei et al.

(10) Patent No.: US 12,261,700 B2
(45) Date of Patent: Mar. 25, 2025

(54) METHOD AND APPARATUS FOR SEMI-STATIC HARQ-ACK CODEBOOK DETERMINATION

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE)

(73) Assignee: Lenovo (Beijing) Limited, Beijing (CN)

(*) Notice: Subject to any disclaimer, the term of this patent is extended or adjusted under 35 U.S.C. 154(b) by 616 days.

(21) Appl. No.: 17/607,308

(22) PCT Filed: May 3, 2019

(86) PCT No.: PCT/CN2019/085433
§ 371 (c)(1),
(2) Date: Oct. 28, 2021

(87) PCT Pub. No.: WO2020/223841
PCT Pub. Date: Nov. 12, 2020

(65) Prior Publication Data
US 2022/0209901 A1   Jun. 30, 2022

(51) Int. Cl.
*H04L 1/1812* (2023.01)
*H04W 72/23* (2023.01)

(52) U.S. Cl.
CPC .......... *H04L 1/1812* (2013.01); *H04W 72/23* (2023.01)

(58) Field of Classification Search
CPC ... H04L 1/1812; H04L 1/1685; H04L 1/1858; H04L 1/1887; H04L 1/1896; H04W 72/23; H04W 72/232
See application file for complete search history.

(56) References Cited

U.S. PATENT DOCUMENTS

2014/0362798 A1* 12/2014 Shu ................ H04L 1/1861
370/329
2015/0189658 A1   7/2015 Zhang et al.
(Continued)

FOREIGN PATENT DOCUMENTS

CN   109075912 A   12/2018
CN   109639398 A   4/2019

OTHER PUBLICATIONS

Ericsson, On new NPUSCH Format 2 for supporting the bundling of ACK/NACK of two NPDSCH HARQ processes, 3GPP TSG-RAN1#87, R1-1612789, Nov. 14-18, 2016, pp. 1-3, Reno, US.
(Continued)

*Primary Examiner* — Michael K Phillips
(74) *Attorney, Agent, or Firm* — Kunzler Bean & Adamson

(57) ABSTRACT

The present application is related to a method and apparatus for semi-static HARQ-ACK codebook determination. A method for semi-static HARQ-ACK codebook determination includes: receiving downlink control information (DCI) scheduling a data transmission in a set of candidate data transmission occasions; transmitting a HARQ-ACK codebook for the set of candidate data transmission occasions; receiving another DCI scheduling another data transmission in another set of candidate data transmission occasions; and transmitting another HARQ-ACK codebook for the abovementioned another set of candidate data transmission occasions.

20 Claims, 9 Drawing Sheets

(56) References Cited

U.S. PATENT DOCUMENTS

| | | | |
|---|---|---|---|
| 2016/0261391 A1 | 9/2016 | Chen et al. | |
| 2020/0127796 A1* | 4/2020 | Li | H04L 1/1812 |
| 2020/0314948 A1* | 10/2020 | Babaei | H04L 5/0055 |
| 2020/0322120 A1* | 10/2020 | Yang | H04L 5/0007 |
| 2020/0389878 A1* | 12/2020 | Karaki | H04W 72/23 |
| 2021/0234643 A1* | 7/2021 | Wang | H04L 1/1887 |
| 2021/0297223 A1* | 9/2021 | Yang | H04L 1/1896 |
| 2022/0039131 A1* | 2/2022 | Lin | H04L 5/001 |
| 2022/0225390 A1* | 7/2022 | Harada | H04L 1/1685 |

OTHER PUBLICATIONS

Samsung, Discussion on HARQ-ACK codebook for NR-U, 3GPP TSG RAN WG1 #96bis, R1-1904412, Apr. 8-12, 2019, pp. 1-7, Xi'an, China.
Ericsson, Potential HARQ enhancements for NR-U, 3GPP TSG-RAN WG1#96, R1-1902885, Feb. 25-Mar. 1, 2019, pp. 1-7, Athens.
International Searching Authority, "Written Opinion of the International Searching Authority," PCT/CN2019/085433, Jan. 23, 2020, pp. 1-4.

* cited by examiner

METHOD AND APPARATUS FOR SEMI-STATIC HARQ-ACK CODEBOOK DETERMINATION

TECHNICAL FIELD

Embodiments of the present application generally relate to wireless communication technology, especially to technology for semi-static hybrid automatic repeat request acknowledgement (HARQ-ACK) codebook determination.

BACKGROUND

In 3rd Generation Partnership Project (3GPP) Long Term Evolution (LTE) Release 8 and onwards, downlink (DL) transport blocks (TBs) are carried on the Physical Downlink Shared Channel (PDSCH). A maximum of two TBs can be transmitted on PDSCH in one serving cell and in one sub-frame. HARQ-ACK in the present application represents collectively the Positive Acknowledgement (ACK) and the Negative Acknowledgement (NACK). ACK means that a TB is correctly received, while NACK means that a TB is erroneously received. The HARQ-ACK feedback bits corresponding to the PDSCH are transmitted either on the Physical Uplink Control Channel (PUCCH) or on the Physical Uplink Shared Channel (PUSCH). HARQ-ACK feedback for multiple PDSCHs can be multiplexed in one HARQ-ACK codebook by means of HARQ-ACK multiplexing.

In order to meet requirements of HARQ-ACK multiplexing in 3GPP 5G New radio (NR), technologies of semi-static HARQ-ACK codebook determination are developed.

SUMMARY

Some embodiments of the present application provide a method for wireless communications performed by a user equipment (UE). The method includes: receiving, from a base station (BS), downlink control information (DCI) scheduling a data transmission in a set of candidate data transmission occasions, wherein the DCI indicates the UE to transmit HARQ-ACK feedback for the set of candidate data transmission occasions; transmitting, to the base station, a HARQ-ACK codebook for the set of candidate data transmission occasions, in response to channel access procedure for transmitting the HARQ-ACK codebook being successful; receiving, from the base station, another DCI scheduling another data transmission in another set of candidate data transmission occasions, wherein the abovementioned another DCI indicates the UE to transmit HARQ-ACK feedback for the abovementioned another set of candidate data transmission occasions, wherein the abovementioned another set of candidate data transmission occasions includes the set of candidate data transmission occasions; and transmitting, to the base station, another HARQ-ACK codebook for the abovementioned another set of candidate data transmission occasions, in response to channel access procedure for transmitting the abovementioned another HARQ-ACK codebook being successful.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method performed by a UE.

Some embodiments of the present application provide a method for wireless communications performed by a base station. The method includes: transmitting, to a UE, DCI scheduling a data transmission in a set of candidate data transmission occasions, wherein the DCI indicates the UE to transmit HARQ-ACK feedback for the set of candidate data transmission occasions; detecting, from the UE, a HARQ-ACK codebook for the set of candidate data transmission occasions; transmitting, to the UE, another DCI scheduling another data transmission in another set of candidate data transmission occasions, wherein the abovementioned another DCI indicates the UE to transmit HARQ-ACK feedback for the abovementioned another set of candidate data transmission occasions, wherein the abovementioned another set of candidate data transmission occasions includes the set of candidate data transmission occasions; and detecting, from the UE, another HARQ-ACK codebook for the abovementioned another set of candidate data transmission occasions.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method performed by a base station.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
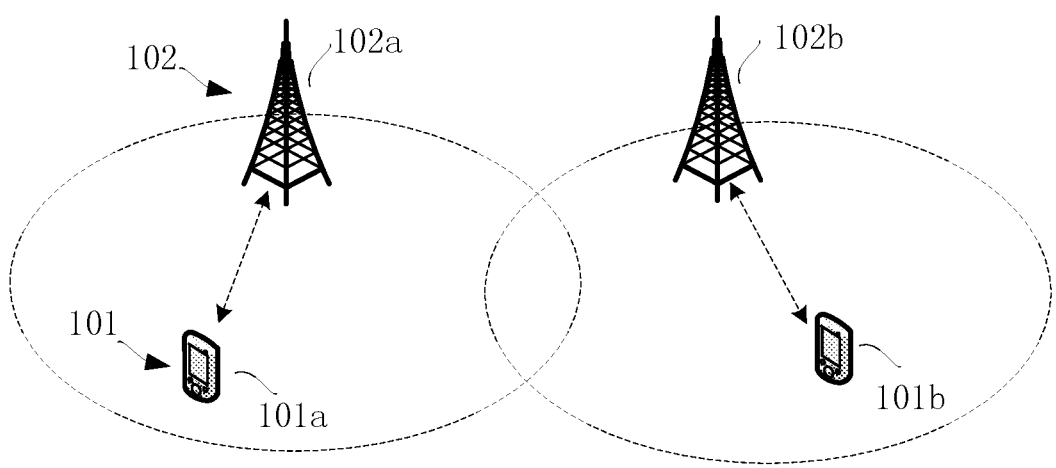
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and two BSs 102 (e.g., BS 102a and BS 102b) for illustrative purpose. Although a specific number of UEs 101 and BSs 102 are depicted in FIG. 1, it is contemplated that any number of UEs 101 and BSs 102 may be included in the wireless communication system 100.

UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, UE(s) 101 includes wearable devices, such as smart watches, fitness bands, optical head-mounted displays, or the like. Moreover, UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE(s) 101 may communicate directly with BSs 102 via uplink (UL) communication signals.

BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. BS(s) 102 is generally part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, BS(s) 102 may communicate over licensed spectrums, whereas in other embodiments BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In 3GPP 5G NR, regarding HARQ-ACK multiplexing, HARQ-ACK codebook includes multiple HARQ-ACK bits for: multiple CBG(s) of one TB; multiple TB(s)/codeword(s) of one PDSCH; multiple PDSCHs in time domain; and/or multiple PDSCHs on multiple configured component carriers. In 3GPP 5G NR Rel-15, a method for HARQ-ACK codebook determination is semi-static HARQ-ACK codebook. For semi-static HARQ-ACK codebook determination defined in 3GPP 5G NR, within a given DL association set, candidate PDSCH occasions are determined based on a set of K1, PDSCH symbol allocation table in time domain, and/or semi-static UL/DL configuration. As a result, semi-static HARQ-ACK codebook is determined based on the following factors: number of valid downlink slots within each downlink association set; number of TBs for one PDSCH; number of configured DL carriers; max number of non-overlapped PDSCH occasions per slot per cell, and/or max number of CBGs per TB. Therefore, the semi-static codebook size determination method is quite simple, and there is no ambiguity between a user equipment (UE) and base station (BS) on determining HARQ-ACK codebook size even when some DL transmissions are missed.

However, the HARQ-ACK codebook size determined at the UE may be different from that determined at the BS if unlicensed carriers are utilized. When HARQ-ACK feedback is to be transmitted on unlicensed carrier, channel access procedure, e.g., listen-before-talk (LBT), is needed before the HARQ-ACK transmission. If and only if LBT is successful, a UE can start HARQ-ACK transmission; otherwise, UE has to give up the HARQ-ACK transmission. If the UE fails to transmit HARQ-ACK feedback due to LBT failure, the corresponding PDSCHs will have to be retransmitted, since BS has no knowledge about the decoding results of the PDSCHs at UE side.

Additionally, HARQ-ACK transmission on unlicensed carrier suffers potential interference from hidden nodes. Even if a UE has successfully transmitted the HARQ feedback, there are still possibilities that the BS fails to decode it. From BS's perspective, if the BS fails to detect HARQ-ACK feedback in the predefined HARQ-ACK feedback timing, the BS will have to assume NACK and retransmit all the corresponding PDSCHs. Both LBT failure and hidden node problem may lead to unnecessary DL retransmission and DL performance degradation due to failed HARQ-ACK reception at BS side.

Considering the risk of HARQ-ACK transmission on unlicensed carrier, there is a need to allow HARQ-ACK feedback to have multiple transmission opportunities. This avoids DL performance loss due to failed HARQ-ACK feedback.

When UE is configured with semi-static HARQ-ACK codebook and triggered to retransmit an earlier HARQ-ACK feedback, the existing semi-static HARQ-ACK codebook determination may not cover the PDSCHs corresponding to the earlier HARQ-ACK feedback so that the earlier HARQ-ACK feedback is not retransmitted and leads to misunderstanding on the HARQ-ACK codebook size between BS and UE. Thus, when UE is configured with semi-static HARQ-ACK codebook, a mechanism on how to trigger UE to retransmit the earlier HARQ-ACK feedback should also be resolved.

Embodiments of the present application aim to provide same understanding on semi-static HARQ-ACK codebook between a BS and a UE. Embodiments of the present application provide solutions of trigger-based semi-static HARQ-ACK codebook determination. Embodiments of the present application provide solutions of trigger-based semi-static HARQ-ACK codebook determination for NR access on unlicensed spectrum (NR-U). More details on embodiments of the present application will be illustrated in the following text in combination with the appended drawings.

Figure 2:
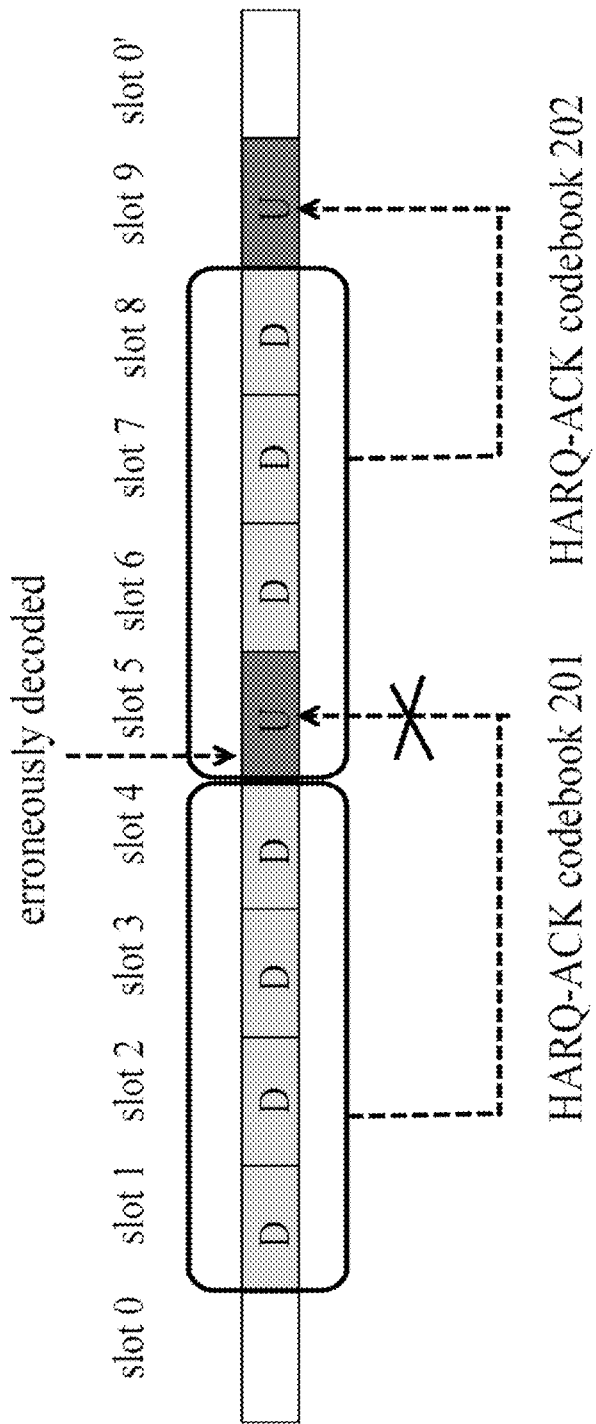
FIG. 2 illustrates an exemplary method of semi-static HARQ-ACK codebook transmission on unlicensed carrier.

FIG. 2 illustrates an exemplary method of semi-static HARQ-ACK codebook transmission on unlicensed carrier. In the exemplary method as shown in FIG. 2, assuming that 15 kHz subcarrier spacing is used, one radio frame includes ten slots, e.g., slot 0, slot 1, slot 2, slot 3, slot 4, slot 5, slot 6, slot 7, slot 8, and slot 9; and slot 0' represents the first slot in the next radio frame. For example, PDSCHs (as shown as "D" in FIG. 2) are received in each of slot 1, slot 2, slot 3, slot 4, slot 6, slot 7, and slot 8, and HARQ-ACK feedback for PDSCHs (as shown as "U" in FIG. 2) are transmitted in slot 5 and slot 9, respectively. It is contemplated that PDSCHs and the corresponding HARQ-ACK feedback may be received or transmitted in different slots. FIGS. 3-6 refer to data structures and characteristics similar to those in FIG. 2 and details are described in the following text.

As shown in FIG. 2, for a plurality of DL transmissions received in a slot set of slot 1, slot 2 slot 3, and slot 4, HARQ-ACK feedback bits may be generated and then transmitted in one PUSCH or one PUCCH in slot 5, and may be called as HARQ-ACK codebook 201 or semi-static HARQ-ACK codebook 201. Similarly, HARQ-ACK feedback bits for PDSCHs in slot 6, slot 7, and slot 8 may be generated and then transmitted in one PUSCH or one PUCCH in slot 9, and may be called as HARQ-ACK codebook 202 or semi-static HARQ-ACK codebook 202.

In the exemplary method as shown in FIG. 2, assuming K1 set {1, 2, 3, 4} for simplicity, when HARQ-ACK codebook 201 is not detected in slot 5 at BS side due to LBT failure at UE side, or HARQ-ACK codebook 201 is erroneously decoded at BS side due to hidden node interference, there is a need to retransmit the HARQ-ACK feedback. However, the downlink association set for HARQ-ACK codebook 202 in slot 9 does not include HARQ-ACK codebook 201 (i.e., HARQ-ACK feedback for PDSCHs in slot 1, slot 2, slot 3, and slot 4). So HARQ-ACK codebook 201 will lose a retransmission opportunity.

Moreover, a BS (e.g., BS 102a as shown in FIG. 1) may expect retransmission of HARQ-ACK feedback (i.e., HARQ-ACK codebook 201) and thus assumes that a size of HARQ-ACK codebook 202 in slot 9 is seven (i.e., all HARQ-ACK feedback bits for PDSCHs in slot 1, slot 2 slot 3, slot 4, slot 6, slot 7, and slot 8 as shown in FIG. 2). However, a UE (e.g., UE 101a as shown in FIG. 1) only considers PDSCHs in slot 6, slot 7, and slot 8 based on the configured K1 set and thus assumes that the size of HARQ-ACK codebook 202 in slot 9 is three (i.e., HARQ-ACK feedback bits for PDSCHs in slot 6, slot 7, and slot 8 as shown in FIG. 2). In other words, the BS assumes that HARQ-ACK feedback information transmitted in slot 9 comprises both a retransmitted HARQ-ACK codebook 201 and a new HARQ-ACK codebook 202 (i.e., HARQ-ACK feedback bits for PDSCHs in slot 6, slot 7, and slot 8 as shown in FIG. 2). Accordingly, due to mismatched HARQ-ACK codebook sizes between the BS and the UE, the BS cannot decode the HARQ-ACK feedback information which is transmitted in slot 5.

Figure 3:
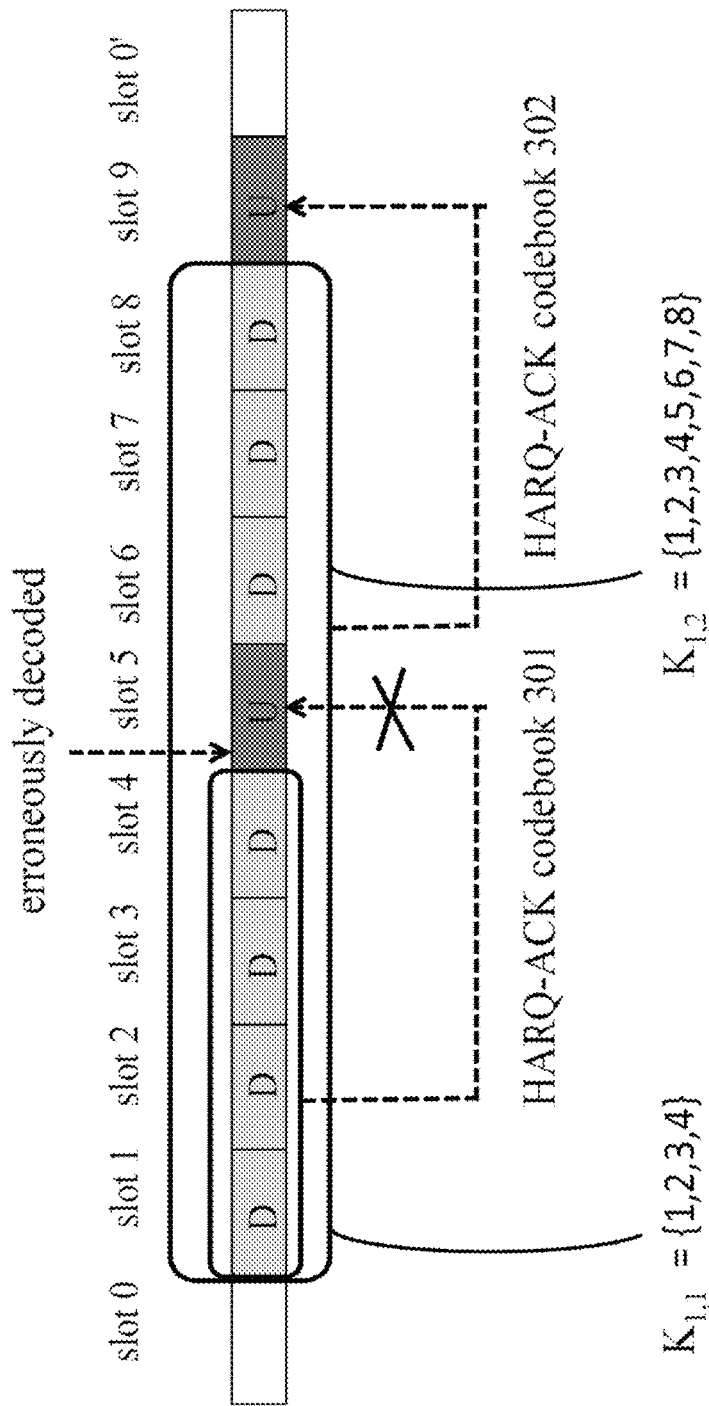
FIG. 3 illustrates an exemplary method of semi-static HARQ-ACK codebook determination in accordance with some embodiments of the present application.

FIG. 3 illustrates an exemplary method of semi-static HARQ-ACK codebook determination in accordance with some embodiments of the present application. Similar to FIG. 2, in embodiments as shown in FIG. 3, PDSCHs (as shown as "D" in FIG. 3) are received in each of slot 1, slot 2, slot 3, slot 4, slot 6, slot 7, and slot 8. HARQ-ACK feedback bits for PDSCHs in slot 1, slot 2 slot 3, and slot 4 are generated and then transmitted in one PUSCH or one PUCCH in slot 5, and are called as HARQ-ACK codebook 301 or semi-static HARQ-ACK codebook 301. HARQ-ACK feedback bits for PDSCHs in slot 6, slot 7, and slot 8 are generated and then transmitted in one PUSCH or one PUCCH in slot 9, and are called as HARQ-ACK codebook 302 or semi-static HARQ-ACK codebook 302.

In the exemplary method as shown in FIG. 3, multiple K1 sets are configured by a BS (e.g., BS 102a as shown in FIG. 1), while only one K1 set is activated for a received PDSCH. For example, multiple K1 sets are configured by a BS (e.g., BS 102a as shown in FIG. 1) via Radio Resource Control (RRC) signaling. The multiple K1 sets are defined to cover different timing ranges. Each K1 set is assigned with a unique index or a unique indicator to differentiate others. DCI may include a field of K1 set indicator for indicating a certain K1 set for HARQ-ACK feedback transmission. For instance, two bits in DCI may include an indicator of a K1 set to indicate this K1 set as the current active K1 set.

In some embodiments of the present application, multiple K1 sets are defined in order. The $n^{th}$ K1 set is a subset of the $(n+1)^{th}$ K1 set. The downlink association set based on the $(n+1)^{th}$ K1 set can cover the downlink association set based on the $n^{th}$ K1 set. Using the $(n+1)^{th}$ K1 set as the active K1 set can trigger a UE (e.g., UE 101a as shown in FIG. 1) to retransmit the earlier HARQ-ACK feedback using the $n^{th}$ K1 set as the active K1 set.

In some other embodiments of the present application, the multiple K1 sets are defined in order, and the $n^{th}$ K1 set is a superset of the $(n+1)^{th}$ K1 set. The downlink association set based on the $n^{th}$ K1 set can cover the downlink association set based on the $(n+1)^{th}$ K1 set. Using the $n^{th}$ K1 set as the active K1 set can trigger a UE (e.g., UE 101a as shown in FIG. 1) to retransmit the earlier HARQ-ACK feedback using the $(n+1)^{th}$ K1 set as the active K1 set.

In some embodiments of the present application, four K1 sets, $K_{1,1}$, $K_{1,2}$, $K_{1,3}$, and $K_{1,4}$ are configured in order as follows:

$K_{1,1}=\{1, 2, 3, 4\}$
$K_{1,2}=\{1, 2, 3, 4, 5, 6, 7, 8\}$
$K_{1,3}=\{1, 2, 3, 4, 5, 6, 7, 8, 9, 10, 11, 12\}$
$K_{1,4}=\{1, 2, 3, 4, 5, 6, 7, 8, 9, 10, 11, 12, 13, 14, 15, 16\}$

For example, for activating a certain K1 set, a K1 set indicator may be carried in two bits in DCI to indicate the activated K1 set. Four code points of two bits in DCI, e.g., code points "0", "1", "2", and "3", may be used to indicate $K_{1,1}$, $K_{1,2}$, $K_{1,3}$, and $K_{1,4}$ as the current active K1 set, respectively.

For indicating a certain PDSCH-to-HARQ timing from a certain K1 set, three bits or four bits in DCI may be used to indicate a timing value from the active K1 set. Three bits for indicating a certain PDSCH-to-HARQ timing from a certain K1 set allows the K1 set to include 8 elements at most. Four bits for indicating a certain PDSCH-to-HARQ timing from a certain K1 set allows the K1 set to include more than 8 elements, e.g., at most 16 elements as shown in the above $K_{1,4}$ set.

From a UE's perspective, a K1 set may be used to determine or derives a set of candidate data transmission occasions. A candidate data transmission occasion(s) means slot(s) where PDSCH(s) may be transmitted to the UE. As shown in FIG. 3, for PDSCHs in slot 1, slot 2 slot 3, and slot 4, the associated scheduling DCIs indicate same K1 set, e.g., $K_{1,1}=\{1, 2, 3, 4\}$, and the certain PDSCH-to-HARQ timing fields indicate that slot 5 is targeted for transmitting the semi-static HARQ-ACK codebook 301. Based on this, a UE (e.g., UE 101a as shown in FIG. 1) determines or derives a downlink association set including slot 1, slot 2 slot 3, and slot 4, and then attempts to transmit semi-static HARQ-ACK codebook 301 in slot 5.

As shown in FIG. 3, if semi-static HARQ-ACK codebook 301 is not transmitted in slot 5 due to LBT failure at UE side (e.g., UE 101a as shown in FIG. 1), or the semi-static HARQ-ACK codebook 301 is erroneously decoded at BS side (e.g., BS 102a as shown in FIG. 1) due to hidden node interference, the BS may trigger a retransmission of semi-static HARQ-ACK codebook 301 by enlarging the downlink association set. For instance, the BS may indicate $K_{1,2}=\{1, 2, 3, 4, 5, 6, 7, 8\}$ as the current active K1 set in the following scheduled slots, i.e., slot 6, slot 7 and slot 8. In this way, the current downlink association set includes slot 1, slot 2, slot 3, slot 4, slot 6, slot 7, and slot 8. So semi-static HARQ-ACK codebook 302 includes both the retransmitted HARQ-ACK feedback for PDSCHs in slot 1, slot 2, slot 3, and slot 4, and the initial HARQ-ACK feedback for PDSCHs in slot 6, slot 7, and slot 8. Semi-static HARQ-ACK codebook 302 is transmitted in slot 9.

In some embodiments of the present application, if semi-static HARQ-ACK codebook 302 in slot 9 is still erroneously decoded at the BS side, the BS may continue to enlarge the downlink association set by activating $K_{1,3}=\{1, 2, 3, 4, 5, 6, 7, 8, 9, 10, 11, 12\}$ as the current active K1 set so as to still cover slot 1, slot 2, slot 3, slot 4, slot 6, slot 7, and slot 8 in the current downlink association set.

In some embodiments of the present application, three K1 sets, $K_{1,1}$, $K_{1,2}$, and $K_{1,3}$ are configured in order as follows:

$K_{1,1}=\{1, 2, 3, 4\}$
$K_{1,2}=\{1, 2, 3, 4, 5, 6, 7, 8\}$
$K_{1,3}=\{1, 2, 3, 4, 5, 6, 7, 8, 9, 10, 11, 12\}$

In these embodiments, for activating a certain K1 set, two bits are included in DCI to indicate the certain K1 set. Three code points of two bits in the DCI, e.g., code points "0", "1", and "2", may be used to indicate $K_{1,1}$, $K_{1,2}$, and $K_{1,3}$ as the current active K1 set, respectively. The reserved code point of two bits in the DCI, e.g., a code point "3", requests a UE to transmit HARQ-ACK feedback for all 16 HARQ processes. This is because further enlarging $K_{1,3}$ is similar to cover all 16 HARQ processes, if no any payload reduction method for semi-static HARQ-ACK codebook is considered.

Specifically, if code point "1" is indicated by two bits in DCI, $K_{1,2}=\{1, 2, 3, 4, 5, 6, 7, 8\}$ is indicated as the current active K1 set; and if code point "3" is indicated by two bits in DCI, a BS indicates a UE to transmit HARQ-ACK feedback for all 16 HARQ processes. Referring to FIG. 3, PDSCHs in slot 1, slot 2, slot 3, slot 4, slot 6, slot 7, and slot 8 correspond to seven HARQ processes. HARQ-ACK feedback information is transmitted in both slot 5 and slot 9. If code point "3" is indicated by two bits in DCI, a BS indicates a UE to transmit HARQ-ACK feedback for all 16 HARQ processes in total, including the abovementioned seven HARQ processes in the slots shown in FIG. 3 as well as nine HARQ processes in other slots (not shown in FIG. 3).

In some embodiments of the present application, HARQ-ACK bits in a semi-static HARQ-ACK codebook are ordered in an ascending order of HARQ process number, i.e., HARQ process identification (ID).

In some embodiments of the present application, four K1 sets, $K_{1,1}$, $K_{1,2}$, and $K_{1,3}$ are configured in order:

$K_{1,1}=\{1, 2, 3, 4\}$
$K_{1,2}=\{1, 2, 3, 4, 5, 6, 7, 8\}$
$K_{1,3}=\{1, 2, 3, 4, 5, 6, 7, 8, 9, 10, 11, 12\}$

In these embodiments, the fourth K1 set may be configured to $K_{1,4}=\{\text{infinity}\}$, or be reserved. The fourth K1 set may also be configured to a set of non-numerical HARQ-ACK timing values. For instance, for activating a certain K1 set, two bits are included in DCI to indicate the certain K1 set. Three code points of two bits in DCI, e.g., code points "0", "1", and "2", may be used to indicate $K_{1,1}$, K and $K_{1,3}$ as the current active K1 set, respectively.

When the reserved code point of "3" indicates a set of non-numerical HARQ-ACK timing values, e.g., $K_{1,4}=\{\text{infinity}\}$, being activated, a UE (e.g., UE 101a as shown in FIG. 1) shall suspend the HARQ-ACK feedback transmission, until one of other three K1 sets (i.e., $K_{1,1}$, $K_{1,2}$, and $K_{1,3}$) is indicated as the current active K1 set. In other words, a function of the fourth K1 set is for suspending a HARQ-ACK feedback transmission of a UE. During the suspending, a UE merely generates HARQ-ACK feedback bit(s), if any, but does not transmit the generated HARQ-ACK feedback bit(s) in any slot. Only after one specific defined K1 sets (e.g., $K_{1,1}$, $K_{1,2}$, or $K_{1,3}$) is indicated as the current active K1 set, the UE may start to transmit the generated HARQ-ACK feedback bit(s) in a slot.

It is noted that the K1 sets mentioned above relate to merely some embodiments of the present disclosure. The number of data transmission occasions in each K1 set is not limited to a multiple of four, and the number of candidate K1 sets is not limited to three or four.

For example, DCI includes a K1 set indicator to instruct a UE to transmit HARQ-ACK feedback for a set of candidate data transmission occasions, while another DCI includes a different K1 set indicator (e.g., the reserved code point of "3") to instruct that HARQ-ACK feedback transmission for another data transmission is to be suspended.

In some embodiments of the present application, a final semi-static HARQ-ACK codebook comprises multiple HARQ-ACK codebooks. For example, a final HARQ-ACK codebook (e.g., HARQ-ACK codebook 302 as shown in FIG. 3) comprises a retransmitted HARQ-ACK codebook (e.g., HARQ-ACK codebook 301 as shown in FIG. 3) and a new HARQ-ACK codebook (e.g., HARQ-ACK feedback information for PDSCHs in slot 6, slot 7, and slot 8 as shown in FIG. 3). From the perspective of a final semi-static HARQ-ACK codebook, the retransmitted HARQ-ACK codebook may be called as a sub-codebook, while the new HARQ-ACK codebook may be called as another sub-codebook.

In some embodiments of the present application, the retransmitted HARQ-ACK codebook is kept unchanged as the previous transmission and then concatenated with the new HARQ-ACK codebook to form the final HARQ-ACK codebook. The retransmitted HARQ-ACK codebook and the new HARQ-ACK codebook may be independently encoded by Reed-Muller (RM) or Polar and may have separate CRC fields.

In some embodiments of the present application, a final semi-static HARQ-ACK codebook comprises all HARQ-ACK information bits for a downlink association set based on the current active K1 set. All HARQ-ACK information bits for the downlink association set (e.g., all HARQ-ACK feedback bits for PDSCHs in slot 1, slot 2, slot 3, slot 4, slot 6, slot 7, and slot 8 as shown in FIG. 3) may be concatenated and then jointly encoded by RM or Polar and may have one CRC field.

In some embodiments of the present application, a K1 set indicator may be included in each DL grant. For a group of PDSCHs with corresponding HARQ-ACK feedback to be initially transmitted in the same HARQ-ACK codebook (e.g., HARQ-ACK codebook 301 as shown in FIG. 3), the associated DL grants should indicate the same K1 set.

For instance, if group 1 of PDSCHs (e.g., PDSCHs in slot 1, slot 2, slot 3, and slot 4 as shown in FIG. 3) and group 2 of PDSCHs (e.g., PDSCHs in slot 6, slot 7, and slot 8 as shown in FIG. 3) are transmitted from a BS to a UE, when the retransmitted HARQ-ACK feedback (e.g., HARQ-ACK codebook 301 as shown in FIG. 3) for group 1 of PDSCHs and the initially transmitted HARQ-ACK feedback for group 2 of PDSCHs are to be multiplexed in the same HARQ-ACK codebook (e.g., HARQ-ACK codebook 302 as shown in FIG. 3), the associated DL grants for group 2 of PDSCHs should indicate same K1 set (e.g., $K_{1,2}=\{1, 2, 3, 4, 5, 6, 7, 8\}$ as shown in FIG. 3), i.e., the updated K1 set for covering the earlier HARQ-ACK feedback for group 1 of PDSCHs. Hence, group 1 of PDSCHs has different K1 set (e.g., $K_{1,1}=\{1, 2, 3, 4\}$ as shown in FIG. 3) from the K1 set for group 2 of PDSCHs (e.g., $K_{12}=\{1, 2, 3, 4, 5, 6, 7, 8\}$ as shown in FIG. 3).

In some embodiments of the present application, a K1 set indicator may be included in triggering DCI. This triggering DCI may be a dedicated DCI or a DL/UL grant used for DL/UL scheduling. With the triggering DCI, a BS may indicate an appropriate K1 set for requesting a UE to retransmit the earlier HARQ-ACK feedback.

In some embodiments of the present application, at BS side (e.g., BS 102a as shown in FIG. 1), there is a processing delay on decoding the HARQ-ACK codebook, i.e., PUCCH or PUSCH. When a BS transmits (or generates) a DL grant for scheduling a new PDSCH, the BS may not know whether it can successfully decode HARQ-ACK feedback corresponding to the previous PDSCHs. Thus, there is no need for the BS to update the K1 set for triggering a retransmission of the HARQ-ACK feedback. In this sense, the BS may continue to indicate the previously used K1 set in the DL grant for scheduling the new PDSCH. If a BS successfully decodes the HARQ-ACK feedback, the BS does not need to change the K1 set and may continue to indicate the same K1 set for the following PDSCHs. If a BS erroneously decodes the HARQ-ACK feedback or misses (i.e., does not detect) the transmission of the HARQ-ACK feedback, the BS may activate a new K1 set with larger downlink association set, so as to cover the earlier PDSCHs with failed HARQ-ACK feedback transmission.

In some embodiments of the present application, before decoding the HARQ-ACK feedback transmission, a BS (e.g., BS 102a as shown in FIG. 1) may indicate a predefined invalid K1 set (e.g., a $K_1$ set predefined as {infinity}), in order to suspend UE's HARQ-ACK feedback transmission for the new PDSCHs. If a BS successfully decodes the earlier HARQ-ACK feedback, the BS may indicate a valid K1 set (e.g., $K_{1,1}=\{1, 2, 3, 4\}$) to only cover the new PDSCHs in the downlink association set, so as to trigger a UE to report HARQ-ACK feedback only for the new PDSCHs. If a BS erroneously decodes the HARQ-ACK feedback or misses (i.e., does not detect) the transmission of the HARQ-ACK feedback, the BS may indicate a valid K1 set (e.g., $K_{1,2}=\{1, 2, 3, 4, 5, 6, 7, 8\}$) to cover the new PDSCHs and the previous PDSCHs in same downlink association set so as to trigger UE reporting HARQ-ACK feedback for the new PDSCHs and retransmitting the HARQ-ACK feedback for the previous PDSCHs.

For instance, in the exemplary method as shown in FIG. 3, assuming three K1 sets are configured in order, $K_{1,1}=\{1, 2, 3, 4\}$, $K_{1,2}=\{1, 2, 3, 4, 5, 6, 7, 8\}$, $K_{1,3}=\{1, 2, 3, 4, 5, 6, 7, 8, 9, 10, 11, 12\}$, while $K_{1,4}$ is configured as {infinity}, wherein $K_{1,1}$ is indicated in DL grants for scheduling PDSCHs in slot 1, slot 2, slot 3, and slot 4. According to indicated $K_{1,1}$ and PDSCH-to-HARQ timing, in slot 5, UE transmits HARQ-ACK codebook 301 corresponding to PDSCHs in slot 1, slot 2, slot 3, and slot 4. Before decoding the HARQ-ACK feedback transmission, assuming a BS needs two slots to complete the decoding, the BS indicates $K_{1,4}$ in DL grants scheduling PDSCHs in slot 6 and slot 7, respectively, in order to suspend UE's HARQ-ACK feedback transmission. Then, if the BS successfully decodes the HARQ-ACK feedback in slot 5, the BS may indicate $K_{1,1}$ in DL grants scheduling PDSCH in slot 8 to only cover the new PDSCHs in the downlink association set of slot 6, slot 7, and slot 8, so as to trigger UE reporting HARQ-ACK feedback only for the new PDSCHs. Alternatively, if the BS erroneously decodes the HARQ-ACK feedback or misses (i.e., does not detect) the transmission of the HARQ-ACK feedback in slot 5, the BS may indicate $K_{1,2}$ in DL grants scheduling PDSCH in slot 8 to cover the new PDSCHs and the previous PDSCHs in same downlink association set so as to trigger UE reporting HARQ-ACK feedback for the new PDSCHs and retransmitting the HARQ-ACK feedback for the previous PDSCHs.

In some embodiments of the present application, at UE side (e.g., UE 101a as shown in FIG. 1), after transmitting HARQ-ACK feedback corresponding to previous PDSCHs, the UE continues to monitor the candidate PDCCH occasions. The UE may detect a DL grant scheduling a new PDSCH, while the DL grant indicates same K1 set with previous PDSCHs. Then, the UE decodes the new PDSCH and prepares the corresponding HARQ-ACK feedback in the slot indicated by a field of K1 set indicator and the PDSCH-to-HARQ timing indication. The UE may detect another DL grant scheduling another new PDSCH and the DL grant indicates a different K1 set.

Under this case, in some embodiments of the present application, the UE follows the latest K1 set, decode the new PDSCH, and prepare the corresponding HARQ-ACK feedback in the slot indicated by the latest K1 set indicator and the latest PDSCH-to-HARQ timing indication. In some embodiments of the present application, when a UE detects multiple DL grants indicate different K1 set indicators while same slot for HARQ-ACK feedback transmission, the UE may select the K1 set with the largest downlink association set within all RRC configured K1 sets.

For example, DCI includes a K1 set indicator to instruct a UE to transmit HARQ-ACK feedback for a set of candidate data transmission occasions, while another DCI includes a different K1 set indicator to instruct the UE to transmit HARQ-ACK feedback for another set of candidate data transmission occasions.

Specifically, in the exemplary method as shown in FIG. 3, $K_{1,1}$ is indicated in the DL grants for scheduling PDSCHs in slot 1, slot 2, slot 3, and slot 4. According to indicated $K_{1,1}$ and PDSCH-to-HARQ timing, in slot 5, the UE transmits HARQ-ACK codebook 301 corresponding to PDSCHs in slot 1, slot 2, slot 3, and slot 4. In slot 6, slot 7, and slot 8, the UE detects three DL grants scheduling PDSCHs in slot 6, slot 7, and slot 8, respectively. Assuming $K_{1,1}$ is indicated as K1 set in DL grants in slot 6 and slot 7 and $K_{1,2}$ as active K1 set in DL grant in slot 8, in some embodiments of the present application, a UE follows $K_{1,2}$ as current active K1 set and generates HARQ-ACK codebook based on the downlink association set of $K_{1,2}$; while in some other embodiments of the present application, a UE selects $K_{1,4}$ as the current active K1 set and generates HARQ-ACK codebook based on the downlink association set of $K_{1,4}$.

In some embodiments of the present application, when a UE detects a predefined invalid K1 set (e.g., a $K_1$ set predefined as {infinity}) or a reserved code point for K1 set indicator, the UE may suspend the HARQ-ACK feedback transmission until a valid K1 set is detected.

In some embodiments of the present application, a total number of HARQ-ACK codebooks to be transmitted is indicated in DCI scheduling DL transmission. If more than 1 HARQ-ACK codebook is indicated, a UE (e.g., UE 101*a* as shown in FIG. 1) assumes the previous HARQ-ACK codebook is triggered by a BS (e.g., BS 102*a* as shown in FIG. 1) for retransmission and the UE may include the previous HARQ-ACK codebook in the current HARQ-ACK codebook. If only one HARQ-ACK codebook is indicated, the UE assumes the previous HARQ-ACK codebook is correctly decoded by the BS and the UE may clear the previous HARQ-ACK codebook and only transmit the new HARQ-ACK feedback. Single K1 set is configured by RRC signaling in these embodiments. Moreover, there is no need to indicate this K1 set in DCI, because only one K1 set is configured in these embodiments.

In some embodiments of the present application, maximum two HARQ-ACK codebooks may be transmitted in one PUCCH or one PUSCH. Hence, one bit in DCI is used to indicate the actual number of HARQ-ACK codebook is 1 or 2. In this way, one HARQ-ACK codebook may have one retransmission opportunity.

In some embodiments of the present application, maximum number of HARQ-ACK codebooks which may be transmitted in one PUCCH or one PUSCH is configured by RRC signaling. This maximum number can be configured to 1, 2, 3, or 4. Correspondingly, log 2 (I) bits are needed in DCI to indicate the actual number of HARQ-ACK codebooks transmitted in one PUCCH or one PUSCH, wherein I is the configured maximum number. When maximum one HARQ-ACK codebook is configured, i.e., I=1, it implies that no HARQ-ACK feedback retransmission is allowed and only new HARQ-ACK feedback is transmitted in the PUCCH or the PUSCH. Thus, there is no need to indicate the total number of HARQ-ACK codebooks by bits in DCI. When I=4, two bits in DCI are used to indicate the actual number of HARQ-ACK codebook is 1 or 2 or 3 or 4. In this way, one HARQ-ACK codebook may have three retransmission opportunities.

In some embodiments of the present application, DCI indicates the total number of retransmitted HARQ-ACK codebooks. If the total number of retransmitted HARQ-ACK codebooks is indicated to zero, a UE does not retransmit any earlier HARQ-ACK codebook. If the total number of retransmitted HARQ-ACK codebooks is indicated to M, wherein M>0, a UE retransmits the last M earlier HARQ-ACK codebooks.

In some embodiments of the present application, at BS side (e.g., BS 102*a* as shown in FIG. 1), there is a processing delay on decoding the HARQ-ACK codebook, i.e., PUCCH or PUSCH. When a BS transmits (or generates) a DL grant for scheduling a new PDSCH, the BS may not know whether it can successfully decode HARQ-ACK feedback corresponding to the previous PDSCHs. Thus, there is no need to indicate more than one HARQ-ACK codebook for triggering the earlier HARQ-ACK feedback retransmission. In this sense, the BS may continue to indicate only one HARQ-ACK codebook in the DL grant for scheduling the new PDSCH. If the BS successfully decodes the HARQ-ACK feedback, the BS does not need to indicate more than one HARQ-ACK codebook and may continue to indicate only one HARQ-ACK codebook for the following PDSCHs. If the BS erroneously decodes the HARQ-ACK feedback or misses (i.e., does not detect) the transmission of the HARQ-ACK feedback, the BS may indicate more than one HARQ-ACK codebook in DL grant, so as to trigger the UE to retransmit the failed HARQ-ACK feedback transmission.

Figure 4:
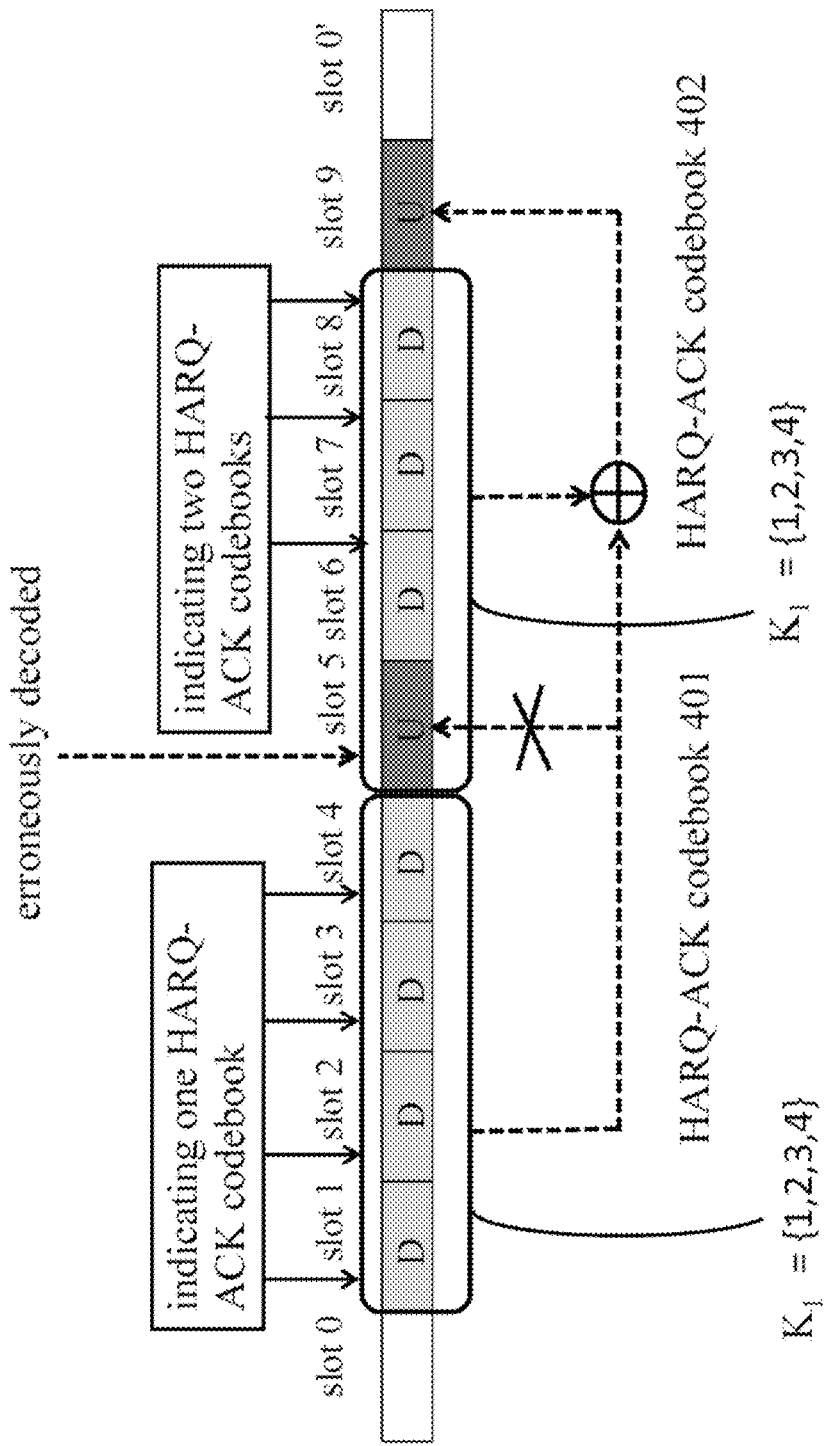
FIG. 4 illustrates another exemplary method of semi-static HARQ-ACK codebook determination in accordance with some embodiments of the present application.

FIG. 4 illustrates another exemplary method of semi-static HARQ-ACK codebook determination in accordance with some embodiments of the present application. Similar to FIGS. 2 and 3, in embodiments as shown in FIG. 4, PDSCHs (as shown as "D" in FIG. 4) are transmitted in each of slot 1, slot 2, slot 3, slot 4, slot 6, slot 7, and slot 8.

As shown in FIG. 4, HARQ-ACK feedback bits for PDSCHs in slot 1, slot 2 slot 3, and slot 4 are generated and then transmitted in one PUSCH or one PUCCH in slot 5, and are called as HARQ-ACK codebook 401 or semi-static HARQ-ACK codebook 401. HARQ-ACK feedback bits for PDSCHs in slot 6, slot 7, and slot 8 are generated and then transmitted in one PUSCH or one PUCCH in slot 9, and are called as HARQ-ACK codebook 402 or semi-static HARQ-ACK codebook 402. The same K1 set, i.e., $K_1=\{1, 2, 3, 4\}$, is indicated in DL grants for scheduling PDSCHs in slot 1, slot 2, slot 3, and slot 4, and DL grants for scheduling PDSCHs in slot 5, slot 6, slot 7, and slot 8. For example, the K1 set may be configured by RRC signaling or predefined.

In the exemplary method as shown in FIG. 4, a BS indicates only one HARQ-ACK codebook in DL grants for scheduling PDSCHs in slot 1, slot 2, slot 3, and slot 4. If semi-static HARQ-ACK codebook 401 is not transmitted in slot 5 due to LBT failure at UE side (e.g., UE 101*a* as shown in FIG. 1), or the semi-static HARQ-ACK codebook 401 is erroneously decoded at BS side (e.g., BS 102*a* as shown in FIG. 1) due to hidden node interference, the BS indicates two HARQ-ACK codebooks in DL grants for scheduling PDSCHs in slot 6, slot 7, and slot 8, so as to trigger the UE to retransmit the failed HARQ-ACK feedback transmission (i.e., semi-static HARQ-ACK codebook 401).

In some embodiments of the present application, DCI includes an indicator indicating the UE to retransmit only one HARQ-ACK codebook for a set of candidate data transmission occasions, while another DCI includes the indicator indicating the UE to transmit two or more HARQ-ACK codebooks for HARQ-ACK feedback for another set of candidate data transmission occasions. In some further embodiments of the present application, the indicator indicates multiple HARQ-ACK codebooks within a set of predefined numbers of HARQ-ACK codebooks. For example, the set of predefined numbers of HARQ-ACK codebooks is configured by RRC signaling.

In some embodiments of the present application, DCI includes an indicator indicating the UE to retransmit zero number of previous HARQ-ACK codebooks for a set of candidate data transmission occasions, while another DCI includes the indicator indicating the UE to transmit one or more previous HARQ-ACK codebooks.

Figure 5:
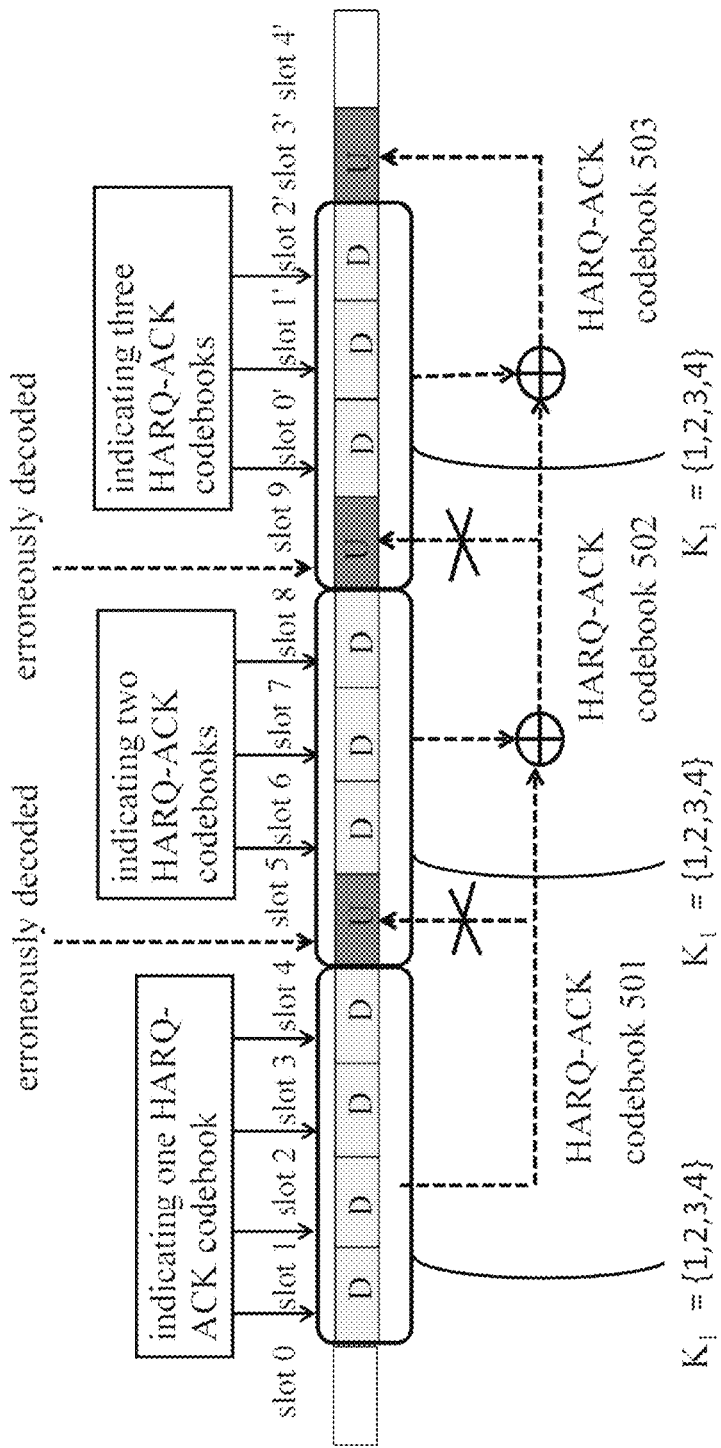
FIG. 5 illustrates a further exemplary method of semi-static HARQ-ACK codebook determination in accordance with some embodiments of the present application.

FIG. 5 illustrates a further exemplary method of semi-static HARQ-ACK codebook determination in accordance with some embodiments of the present application. Similar to FIGS. 2, 3, and 4, in embodiments as shown in FIG. 5, PDSCHs (as shown as "D" in FIG. 4) are transmitted in each of slot 1, slot 2, slot 3, slot 4, slot 6, slot 7, slot 8, slot 0', slot 1', and slot 2'.

As shown in FIG. 5, HARQ-ACK feedback bits for PDSCHs in slot 1, slot 2 slot 3, and slot 4 are generated and then transmitted in one PUSCH or one PUCCH in slot 5, and are called as HARQ-ACK codebook 501 or semi-static HARQ-ACK codebook 501. HARQ-ACK feedback bits for PDSCHs in slot 6, slot 7, and slot 8 are generated and then transmitted in one PUSCH or one PUCCH in slot 9, and are included in HARQ-ACK codebook 502 or semi-static HARQ-ACK codebook 502. HARQ-ACK feedback bits for PDSCHs in slot 9, slot 0', slot 1', and slot 2' are generated and then transmitted in one PUSCH or one PUCCH in slot 3', and are included in HARQ-ACK codebook 503 or semi-static HARQ-ACK codebook 503. The same K1 set, i.e., $K_1=\{1, 2, 3, 4\}$, is configured and used for all scheduled PDSCHs in slot 1, slot 2, slot 3, slot 4, slot 5, slot 6, slot 7, and slot 8, slot 9, slot 0', slot 1', and slot 2'. For example, the K1 set may be predefined.

In the exemplary method as shown in FIG. 5, a BS (e.g., BS 102a as shown in FIG. 1) indicates only one HARQ-ACK codebook in DL grants for scheduling PDSCHs in slot 1, slot 2, slot 3, and slot 4. In the case that semi-static HARQ-ACK codebook 501 is not transmitted in slot 5 due to LBT failure at UE side (e.g., UE 101a as shown in FIG. 1), or the semi-static HARQ-ACK codebook 501 is erroneously decoded at BS side due to hidden node interference, the BS indicates two HARQ-ACK codebooks in DL grants for scheduling PDSCHs in slot 6, slot 7, and slot 8, so as to trigger the UE to retransmit the failed HARQ-ACK feedback transmission (i.e., semi-static HARQ-ACK codebook 501). In the case that semi-static HARQ-ACK codebook 502 is not transmitted in slot 9 due to LBT failure at UE side (e.g., UE 101a as shown in FIG. 1), or the semi-static HARQ-ACK codebook 502 is erroneously decoded at BS side due to hidden node interference, the BS indicates three HARQ-ACK codebooks in DL grants for scheduling PDSCHs in slot 0', slot 1', and slot 2', so as to trigger the UE to retransmit the failed HARQ-ACK feedback transmission (i.e., semi-static HARQ-ACK codebook 502).

In some embodiments of the present application, before decoding the HARQ-ACK feedback transmission, a BS (e.g., BS 102a as shown in FIG. 1) may indicate a predefined invalid number of HARQ-ACK codebooks (e.g., zero) in DL grant, in order to suspend UE's HARQ-ACK feedback transmission for the new PDSCHs. If a BS successfully decodes the earlier HARQ-ACK feedback, the BS may indicate only one HARQ-ACK codebook for the following PDSCHs, so as to trigger a UE reporting HARQ-ACK feedback only for the new PDSCHs. If a BS erroneously decodes the HARQ-ACK feedback or misses (i.e., does not detect) the transmission of the HARQ-ACK feedback, the BS may indicate more than one HARQ-ACK codebook in DL grant so as to trigger UE reporting HARQ-ACK feedback for the new PDSCHs and retransmitting the HARQ-ACK feedback for the previous PDSCHs.

Figure 6:
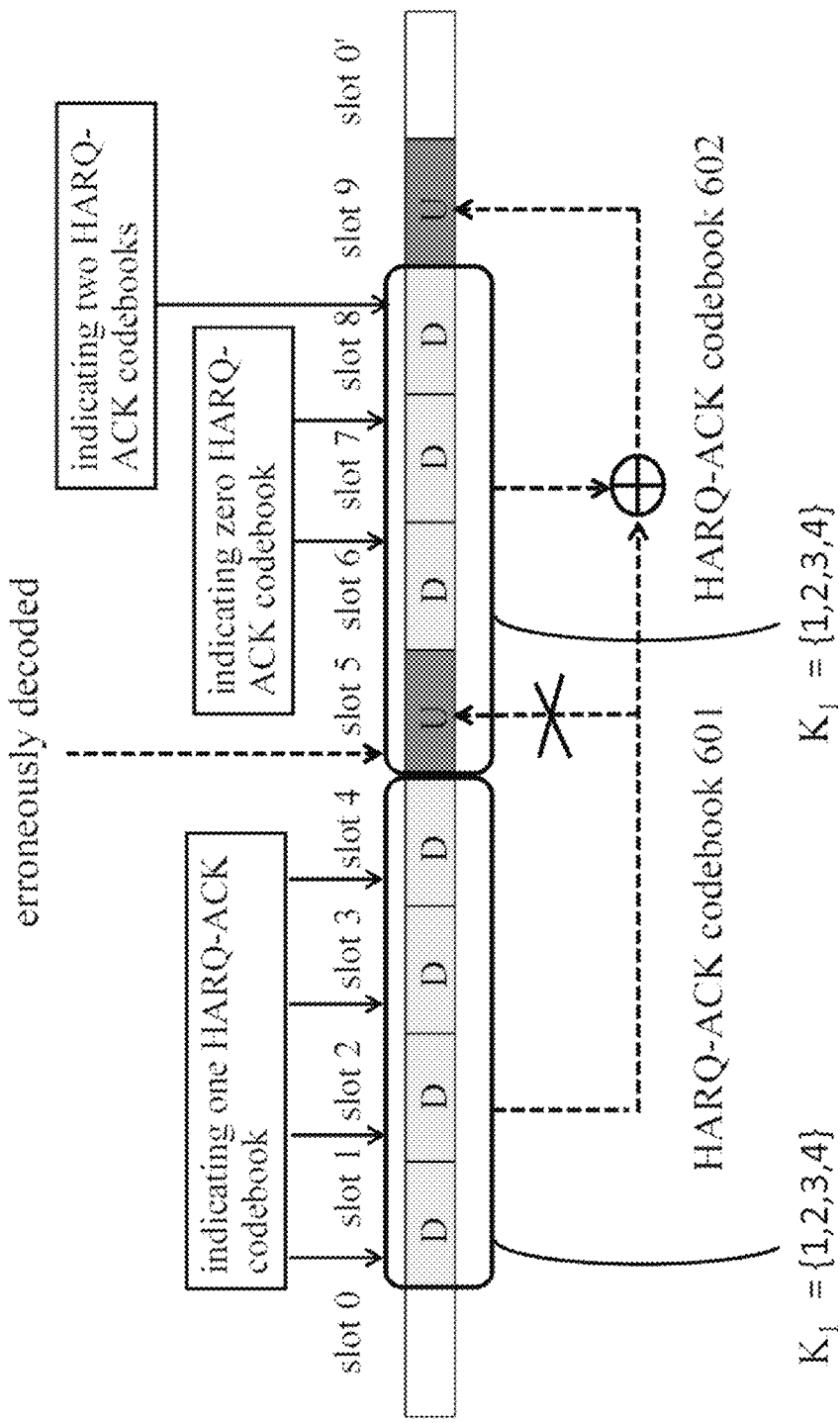
FIG. 6 illustrates an additional exemplary method of semi-static HARQ-ACK codebook determination in accordance with some embodiments of the present application.

FIG. 6 illustrates an additional exemplary method of semi-static HARQ-ACK codebook determination in accordance with some embodiments of the present application. FIG. 6 refers to data structures and characteristics similar to those in FIGS. 2-5 which are described in the above text.

In the exemplary method as shown in FIG. 6, only one HARQ-ACK codebook is indicated in the DL grants for scheduling PDSCHs in slot 1, slot 2, slot 3, and slot 4. According to the configured K1 set and PDSCH-to-HARQ timing, a UE transmits, in slot 5, HARQ-ACK codebook 601 corresponding to PDSCHs in slot 1, slot 2, slot 3, and slot 4. Before decoding the HARQ-ACK feedback transmission, assuming a BS needs two slots to complete the decoding, the BS may indicate zero HARQ-ACK codebook in the DL grants scheduling PDSCHs in slot 6 and slot 7, respectively, in order to suspend UE's HARQ-ACK feedback transmission. As shown in FIG. 6, if a BS erroneously decodes the HARQ-ACK feedback or misses (i.e., does not detect) the transmission of the HARQ-ACK feedback in slot 5, the BS may indicate two HARQ-ACK codebooks in DL grant scheduling the new PDSCH in slot 8, so as to trigger the UE to report HARQ-ACK feedback for the new PDSCHs in slot 6, slot 7, and slot 8 and retransmit the HARQ-ACK feedback for the previous PDSCHs in slot 1, slot 2, slot 3, and slot 4. HARQ-ACK codebook 602 may be transmitted in slot 9 as shown in FIG. 6. On the other hand, if a BS successfully decodes the HARQ-ACK feedback in slot 5, the BS may indicate only one HARQ-ACK codebook in the DL grant scheduling the new PDSCH in slot 8, so as to trigger the UE to report HARQ-ACK feedback only for the new PDSCHs in slot 6, slot 7, and slot 8.

In some embodiments of the present application, at UE side (e.g., UE 101a as shown in FIG. 1), after transmitting HARQ-ACK feedback corresponding to previous PDSCHs, a UE continues to monitor the candidate PDCCH occasions. The UE may detect a DL grant scheduling a new PDSCH, the DL grant indicates only one HARQ-ACK codebook, and the UE decodes the new PDSCH and prepares the corresponding HARQ-ACK feedback in the slot indicated by a field of K1 set indicator and the PDSCH-to-HARQ timing indication. The UE may detect another DL grant scheduling another new PDSCH, wherein the abovementioned another DL grant indicates more than one HARQ-ACK codebook.

Under this case, in some embodiments of the present application, the UE may follow the latest number of HARQ-ACK codebooks and decode the new PDSCH and prepare the corresponding HARQ-ACK feedback in the slot indicated by the PDSCH-to-HARQ timing indication. In some other embodiments of the present application, when the UE detects multiple DL grants indicating different numbers of HARQ-ACK codebooks, while HARQ-ACK feedback transmission is to be transmitted in the same slot, the UE selects the largest value of number of HARQ-ACK codebooks configured by a BS.

For example, as shown in FIG. 6, only one HARQ-ACK codebook is indicated in the DL grants for scheduling PDSCHs in slot 1, slot 2, slot 3, and slot 4. According to K1 set and PDSCH-to-HARQ timing, in slot 5, UE transmits HARQ-ACK codebook 601 corresponding to PDSCHs in slot 1, slot 2, slot 3, and slot 4. In slot 6, slot 7, and slot 8, a UE detects three DL grants scheduling PDSCHs in slot 6, slot 7, and slot 8, respectively. Assuming only one HARQ-ACK codebook is indicated in DL grants in slot 6 and slot 7 and two HARQ-ACK codebooks in DL grant in slot 8, as shown in FIG. 6, in some embodiments of the present application, the UE follows the number of HARQ-ACK codebooks in slot 8 and generates HARQ-ACK codebook 602 including the earlier HARQ-ACK codebook 601 for previous PDSCHs and HARQ-ACK feedback information for new PDSCHs in slot 6, slot 7, and slot 8; and in some other embodiments of the present application, the UE determines four HARQ-ACK codebooks (i.e., the largest value configured by a BS) and generates HARQ-ACK codebook 602 including the earlier HARQ-ACK codebook 601 for previous PDSCHs and HARQ-ACK feedback information for new PDSCHs in slot 6, slot 7, and slot 8.

In some embodiments of the present application, when a UE detects a predefined invalid number of HARQ-ACK codebooks (e.g., zero) or a reserved code point for indicating number of HARQ-ACK codebooks, the UE may suspend the HARQ-ACK feedback transmission until a valid number of HARQ-ACK codebooks (e.g., one HARQ-ACK codebook, or two HARQ-ACK codebooks) is detected.

In some embodiments of the present application, a final HARQ-ACK codebook (e.g., HARQ-ACK codebook 402, 503, or 602 as shown in FIG. 4, FIG. 5, or FIG. 6, respectively) comprises multiple HARQ-ACK codebooks, i.e., the retransmitted HARQ-ACK codebook (e.g., HARQ-ACK codebook 401, 501, 502, or 601 as shown in FIG. 4, FIG. 5, or FIG. 6, respectively) and the new HARQ-ACK codebook (e.g., HARQ-ACK feedback information for new PDSCHs in slot 6, slot 7, and slot 8 as shown in FIG. 4 or FIG. 6; or HARQ-ACK feedback information for new PDSCHs in slot 0', slot 1', and slot 2' as shown in FIG. 5, respectively). The retransmitted HARQ-ACK codebook is kept unchanged as the previous transmission and then concatenated with the new HARQ-ACK codebook as the final HARQ-ACK codebook. Hence, the retransmitted HARQ-ACK codebook and the new HARQ-ACK codebook are independently encoded by RM or Polar and may have separate CRC fields.

In some embodiments of the present application, a final HARQ-ACK codebook (e.g., HARQ-ACK codebook 402, 503, or 602 as shown in FIG. 4, FIG. 5, or FIG. 6, respectively) comprises all HARQ-ACK information bits for the downlink association set based on the current active K1 set. Hence, all the HARQ-ACK information bits for the downlink association set are jointly encoded by RM or Polar and have one CRC field.

In some embodiments of the present application, the retransmitted HARQ-ACK information bits are bundled to one or more bits. The number of bundled HARQ-ACK information bits depends on a bundle size, i.e., how many bits are bundled to one bit. The total number of retransmitted HARQ-ACK information bits is determined based on a specific bundle size. A bundle size may be RRC configured or predefined.

When a UE is triggered to retransmit the earlier HARQ-ACK feedback, the UE may perform logic AND operation across the earlier HARQ-ACK information bits (e.g., bits in HARQ-ACK codebook 401, 501, 502, or 601 as shown in FIG. 4, FIG. 5, or FIG. 6, respectively) to generate the bundled bits. Then, the bundled bits may be concatenated with the HARQ-ACK information bits for new PDSCHs in same HARQ-ACK codebook (e.g., HARQ-ACK feedback bits for PDSCHs in slot 6, slot 7, and slot 8 as shown in FIG. 4 or FIG. 6; or HARQ-ACK feedback bits for PDSCHs in slot 0', slot 1', and slot 2' as shown in FIG. 5, respectively). The bundled bits may be appended at the end of the new HARQ-ACK information bits. The bundled bits may be prepended at the beginning of the new HARQ-ACK information bits.

For example, if a bundle size is configured as "2" and the earlier HARQ-ACK codebook has 4 HARQ-ACK bits, the first two HARQ-ACK bits are bundled to one bit, and the last two HARQ-ACK bits are bundled to another bit according to the bundle size "2". The bundled two bits are then concatenated with HARQ-ACK information bits for new PDSCHs for further encoding.

For a further example, if the bundle size is configured as "4" and the earlier HARQ-ACK codebook has 4 HARQ-ACK bits, all four HARQ-ACK bits are bundled into one bit according to the bundle size "4". The bundled one bit is then concatenated with HARQ-ACK information bits for new PDSCHs for further encoding.

In some embodiments of the present application, a UE (e.g., UE 101a as shown in FIG. 1) performs HARQ-ACK bundling operation for a HARQ-ACK codebook (e.g., HARQ-ACK codebook 601 as shown in FIG. 6) for a set of candidate data transmission occasions (e.g., slot 1, slot 2, slot 3, and slot 4) based on a bundle size (e.g., "2"), to generate one or more bundled HARQ-ACK bits (e.g., 2 bundled HARQ-ACK bits); wherein another HARQ-ACK codebook comprises the one or more bundled HARQ-ACK bits and HARQ-ACK feedback bits for the remaining candidate data transmission occasions (e.g., slot 5, slot 6, slot 7, and slot 8) of another set of candidate data transmission occasions (e.g., all slot 1 to slot 8) except the set of candidate data transmission occasions (e.g., slot 1 to slot 4).

Figure 7:
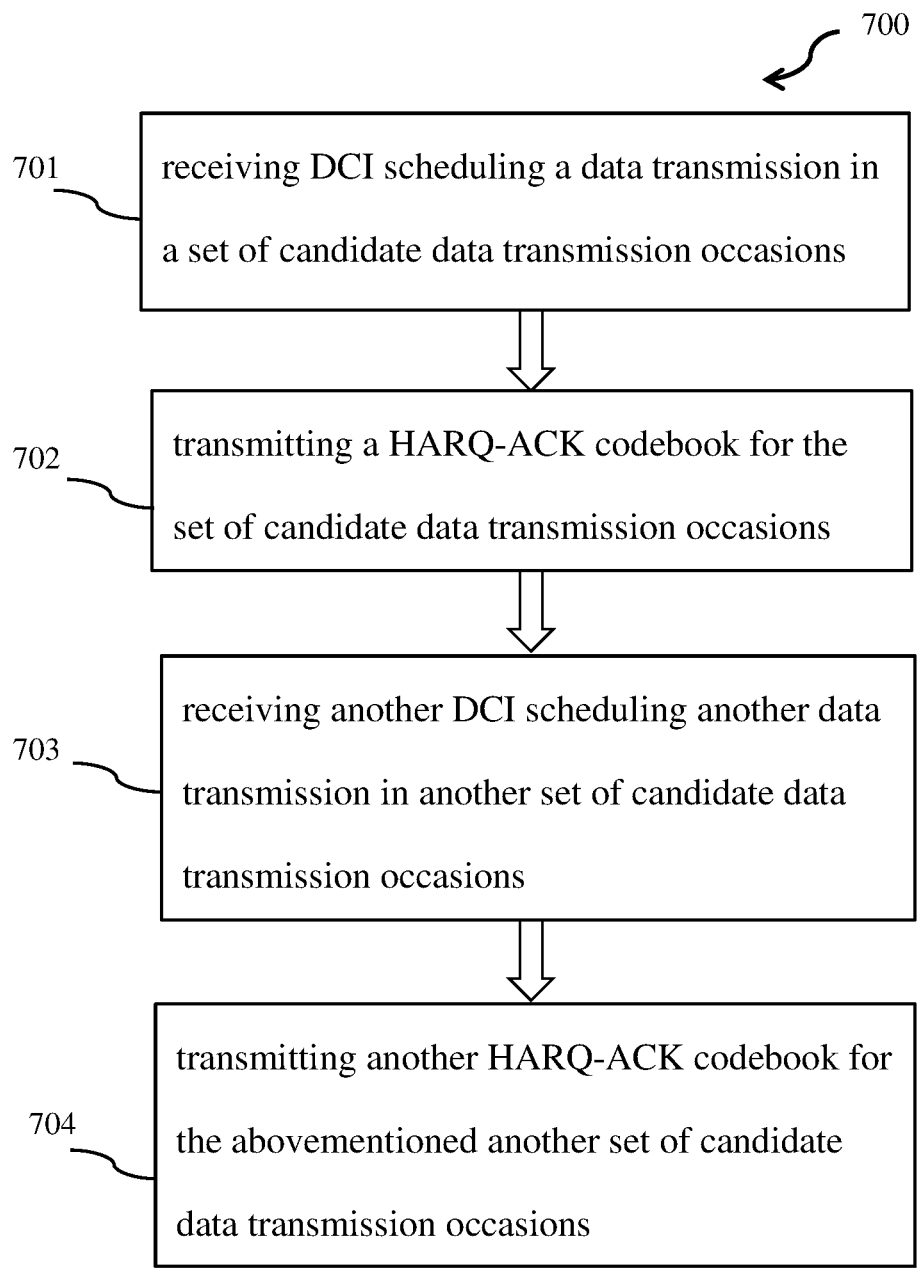
FIG. 7 illustrates a flow chart of a method for wireless communications in accordance with some embodiments of the present application.

FIG. 7 illustrates a flow chart of a method for wireless communications in accordance with some embodiments of the present application. Referring to FIG. 7, method 700 is performed by a UE (e.g., UE 101a as shown in FIG. 1) in some embodiments of the present application.

In operation 701, a UE (e.g., UE 101a as shown in FIG. 1) receives DCI scheduling a data transmission in a set of candidate data transmission occasions. In operation 702, the UE transmits a HARQ-ACK codebook for the set of candidate data transmission occasions. In operation 703, the UE receives another DCI scheduling another data transmission in another set of candidate data transmission occasions. In operation 704, the UE transmits another HARQ-ACK codebook for the abovementioned another set of candidate data transmission occasions.

More specifically, a UE (e.g., UE 101a as shown in FIG. 1) receives, from a BS (e.g., BS 102a as shown in FIG. 1), DCI scheduling a data transmission in a set of candidate data transmission occasions, wherein the DCI indicates the UE to transmit HARQ-ACK feedback for the set of candidate data transmission occasions; in response to channel access procedure for transmitting the HARQ-ACK codebook being successful, the UE transmits, to the BS, a HARQ-ACK codebook for the set of candidate data transmission occasions; the UE receives, from the BS, another DCI scheduling another data transmission in another set of candidate data transmission occasions, wherein the abovementioned another DCI indicates the UE to transmit HARQ-ACK feedback for the abovementioned another set of candidate data transmission occasions, wherein the abovementioned another set of candidate data transmission occasions includes the set of candidate data transmission occasions; and in response to channel access procedure for transmitting the second HARQ-ACK codebook being successful, the UE transmits, to the BS, another HARQ-ACK codebook for the abovementioned another set of candidate data transmission occasions.

Details described in all the foregoing embodiments of the present application (for example, how to configure DCI for a data transmission in a set of candidate data transmission occasions, how to generate a semi-static HARQ-ACK codebook, and how to multiplex semi-static HARQ-ACK codebooks) are applicable for the embodiments as shown in FIG. 7.

Figure 8:
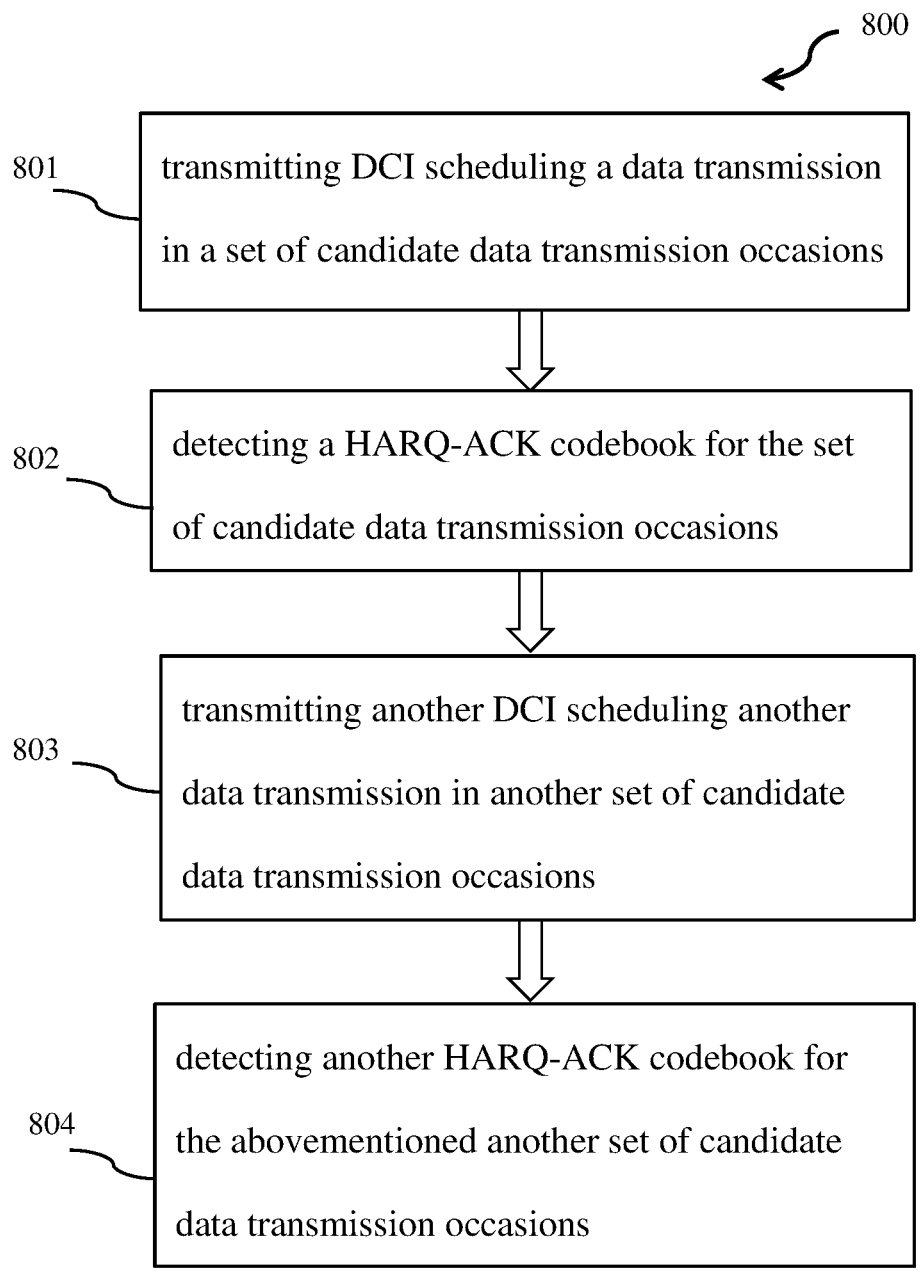
FIG. 8 illustrates another flow chart of a method for wireless communications in accordance with some embodiments of the present application.

FIG. 8 illustrates another flow chart of a method for wireless communications in accordance with some embodiments of the present application. Referring to FIG. 8, method 800 is performed by a BS (e.g., BS 102a as shown in FIG. 1) in some embodiments of the present application.

In operation 801, a BS (e.g., BS 102a as shown in FIG. 1) transmits DCI scheduling a data transmission in a set of candidate data transmission occasions. In operation 802, the BS detects a HARQ-ACK codebook for the set of candidate data transmission occasions. In operation 803, the BS transmits another DCI scheduling another data transmission in another set of candidate data transmission occasions. In operation 804, the BS detects another HARQ-ACK codebook for the abovementioned another set of candidate data transmission occasions.

More specifically, a BS (e.g., BS 102a as shown in FIG. 1) transmits, to a UE (e.g., UE 101a as shown in FIG. 1), DCI scheduling a data transmission in a set of candidate data transmission occasions, wherein the DCI indicates the UE to transmit HARQ-ACK feedback for the set of candidate data transmission occasions; the BS detects, from the UE, a HARQ-ACK codebook for the set of candidate data transmission occasions; the BS transmits, to the UE, another DCI scheduling another data transmission in another set of candidate data transmission occasions, wherein the abovementioned another DCI indicates the UE to transmit HARQ-ACK feedback for the abovementioned another set of candidate data transmission occasions, wherein the abovementioned another set of candidate data transmission occasions includes the set of candidate data transmission occasions; and the BS detects, from the UE, another HARQ-ACK codebook for the abovementioned another set of candidate data transmission occasions.

Details described in all the foregoing embodiments of the present application (for example, how to configure DCI for a data transmission in a set of candidate data transmission occasions, how to detect a semi-static HARQ-ACK codebook, and how to decode a semi-static HARQ-ACK codebook) are applicable for the embodiments as shown in FIG. 8.

Figure 9:
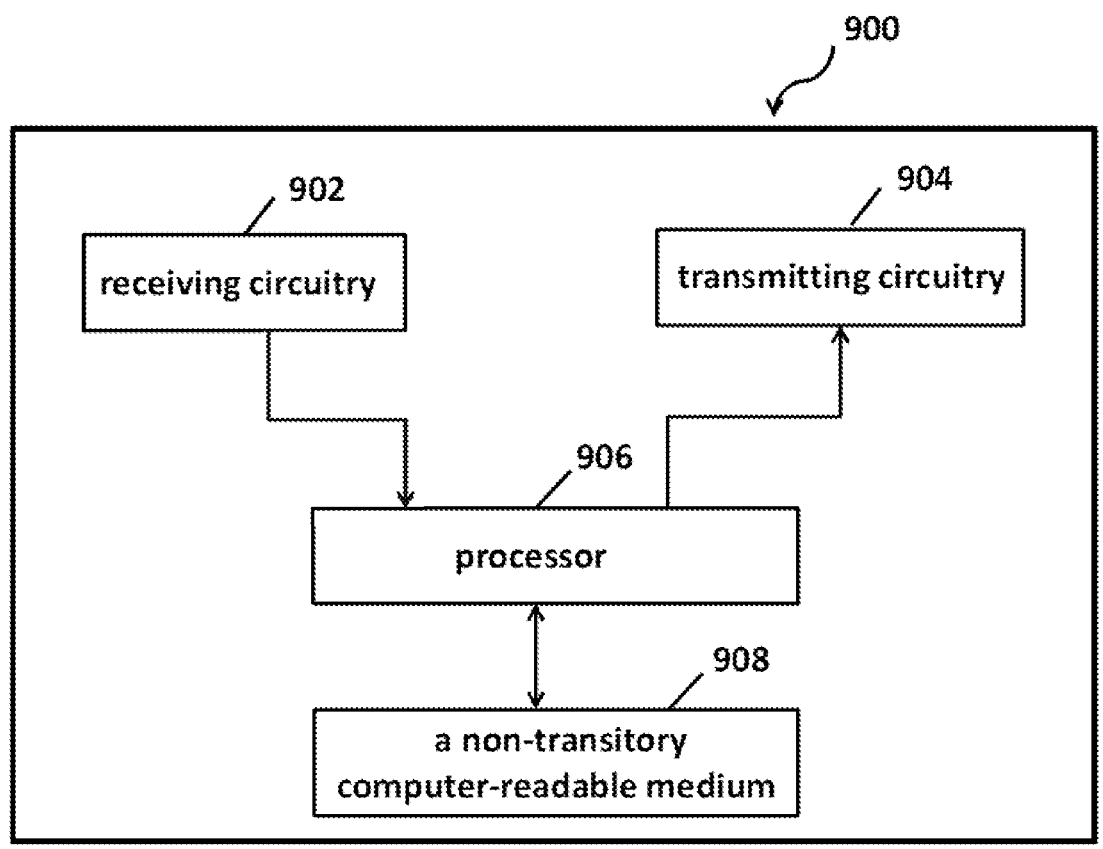
FIG. 9 illustrates a block diagram of an exemplary apparatus in accordance with some embodiments of the present application.

FIG. 9 illustrates a block diagram of an exemplary apparatus in accordance with some embodiments of the present application. Referring to FIG. 9, the apparatus 900 includes a non-transitory computer-readable medium 908, a receiving circuitry 902, a transmitting circuitry 904, and a processor 906. The processor 906 is coupled to the non-transitory computer-readable medium 908, the receiving circuitry 902, and the transmitting circuitry 904.

It is contemplated that some components are omitted in FIG. 9 for simplicity. In some embodiments, the receiving circuitry 902 and the transmitting circuitry 904 may be integrated into a single component (e.g., a transceiver).

In some embodiments, the non-transitory computer-readable medium 908 may have stored thereon computer-executable instructions to cause a processor to implement the operations with respect to UE(s) as described above. For example, the computer-executable instructions may be executed to cause the processor 906 to control the receiving circuitry 902 and transmitting circuitry 904 to perform the operations with respect to UE(s) as described and illustrated with respect to FIGS. 1-8.

In some embodiments, the non-transitory computer-readable medium 908 may have stored thereon computer-executable instructions to cause a processor to implement the operations with respect to BS(s) as described above. For example, the computer-executable instructions may be executed to cause the processor 906 to control the receiving circuitry 902 and transmitting circuitry 904 to perform the operations with respect to BS(s) as described and illustrated with respect to FIGS. 1-8.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment, the method comprising:
   receiving, from a base station, first downlink control information scheduling a first data transmission in a first set of candidate data transmission occasions, wherein the first downlink control information:
      indicates the user equipment to transmit hybrid automatic repeat request acknowledgement feedback for the first set of candidate data transmission occasions; and
      includes a first indicator indicating a first set of hybrid automatic repeat request acknowledgement timing values, wherein the first set of hybrid automatic repeat request acknowledgement timing values comprises a set of hybrid automatic repeat request acknowledgement timing values within a plurality of sets of hybrid automatic repeat request acknowledgement timing values, the plurality of sets of hybrid automatic repeat request acknowledgement timing values comprising a set of non-numerical, hybrid automatic repeat request acknowledgement timing values indicating hybrid automatic repeat request acknowledgement feedback transmission is to be suspended, the set of non-numerical, hybrid automatic repeat request acknowledgement timing values corresponding to a numerical indicator;
   transmitting, to the base station, a first hybrid automatic repeat request acknowledgement codebook for the first set of candidate data transmission occasions in response to channel access procedure for transmitting the first hybrid automatic repeat request acknowledgement codebook being successful;
   receiving, from the base station, second downlink control information scheduling a second data transmission in a second set of candidate data transmission occasions, wherein:
      the second downlink control information indicates the user equipment to transmit hybrid automatic repeat request acknowledgement feedback for the second set of candidate data transmission occasions;
      the second set of candidate data transmission occasions includes the first set of candidate data transmission occasions;
      the second downlink control information includes a second indicator indicating a second set of hybrid automatic repeat request acknowledgement timing values; and
      the second set of hybrid automatic repeat request acknowledgement timing values includes the first set of hybrid automatic repeat request acknowledgement timing values; and
   transmitting, to the base station, a second hybrid automatic repeat request acknowledgement codebook for the second set of candidate data transmission occasions in response to channel access procedure for transmitting the second hybrid automatic repeat request acknowledgement codebook being successful.

2. The method of claim 1, wherein the first set of hybrid automatic repeat request acknowledgement timing values is used to determine the first set of candidate data transmission occasions.

3. The method of claim 1, wherein the plurality of hybrid automatic repeat request acknowledgement timing sets are configured in order, and an nth hybrid automatic repeat request acknowledgement timing set is a subset or a superset of an (n+1)th hybrid automatic repeat request acknowledgement timing set within the plurality of hybrid automatic repeat request acknowledgement timing sets.

4. The method of claim 1, wherein the second set of hybrid automatic repeat request acknowledgement timing values is used to determine the second set of candidate data transmission occasions.

5. The method of claim 1, wherein the second downlink control information includes a third indicator requesting the user equipment to transmit hybrid automatic repeat request acknowledgement feedback for all hybrid automatic repeat request processes of the user equipment.

6. The method of claim 5, wherein hybrid automatic repeat request acknowledgement bits in the second hybrid automatic repeat request acknowledgement codebook are ordered in an ascending order of hybrid automatic repeat request process number.

7. The method of claim 1, wherein the second downlink control information includes a third indicator indicating the user equipment to transmit hybrid automatic repeat request acknowledgement feedback for the second set of candidate data transmission occasions.

8. The method of claim 1, wherein the second downlink control information includes a third indicator indicating hybrid automatic repeat request acknowledgement feedback transmission for the second data transmission is to be suspended.

9. The method of claim 1, wherein the second downlink control information includes a third indicator indicating two or more hybrid automatic repeat request acknowledgement codebooks for hybrid automatic repeat request acknowledgement feedback for the second set of candidate data transmission occasions.

10. The method of claim 9, wherein the third indicator indicates the number of hybrid automatic repeat request acknowledgement codebooks within a set of predefined numbers of hybrid automatic repeat request acknowledgement codebooks.

11. The method of claim 10, wherein the set of predefined numbers of hybrid automatic repeat request acknowledgement codebooks is configured by radio resource control signaling.

12. The method of claim 1, wherein the second downlink control information includes a third indicator indicating the user equipment to transmit one or more previous hybrid automatic repeat request acknowledgement codebooks.

13. The method of claim 1, wherein the second hybrid automatic repeat request acknowledgement codebook comprises the first hybrid automatic repeat request acknowledgement codebook and a second sub-codebook, and the second sub-codebook comprises the hybrid automatic repeat request acknowledgement feedback for the remaining candidate data transmission occasions of the second set of candidate data transmission occasions except the first set of candidate data transmission occasions.

14. The method of claim 1, further comprising:
   performing hybrid automatic repeat request acknowledgement bundling operation for the first hybrid automatic repeat request acknowledgement codebook based on a bundle size, to generate one or more bundled hybrid automatic repeat request acknowledgement bits, wherein the second hybrid automatic repeat request acknowledgement codebook comprises the one or more bundled hybrid automatic repeat request acknowledgement bits for the first set of candidate data transmission occasions and the hybrid automatic repeat request acknowledgement feedback for the remaining candidate data transmission occasions of the second set of candidate data transmission occasions except the first set of candidate data transmission occasions.

15. A method performed by a base station, the method comprising:

transmitting, to a user equipment, first downlink control information scheduling a first data transmission in a first set of candidate data transmission occasions, wherein the first downlink control information:

indicates the user equipment to transmit hybrid automatic repeat request acknowledgement feedback for the first set of candidate data transmission occasions; and includes a first indicator indicating a set of hybrid automatic repeat request acknowledgement timing values, wherein the first set of hybrid automatic repeat request acknowledgement timing values comprises a set of hybrid automatic repeat request acknowledgement timing values within a plurality of sets of hybrid automatic repeat request acknowledgement timing values, the plurality of sets of hybrid automatic repeat request acknowledgement timing values comprising a set of non-numerical, hybrid automatic repeat request acknowledgement timing values indicating hybrid automatic repeat request acknowledgement feedback transmission is to be suspended, the set of non-numerical, hybrid automatic repeat request acknowledgement timing values corresponding to a numerical indicator;

detecting, from the user equipment, a first hybrid automatic repeat request acknowledgement codebook for the first set of candidate data transmission occasions;

transmitting, to the user equipment, second downlink control information scheduling a second data transmission in a second set of candidate data transmission occasions, wherein:

the second downlink control information indicates the user equipment to transmit hybrid automatic repeat request acknowledgement feedback for the second set of candidate data transmission occasions;

the second set of candidate data transmission occasions includes the first set of candidate data transmission occasions;

the second downlink control information includes a second indicator indicating a second set of hybrid automatic repeat request acknowledgment timing values; and the second set of hybrid automatic repeat request acknowledgment timing values includes the first set of hybrid automatic repeat request acknowledgment timing values; and detecting, from the user equipment, a second hybrid automatic repeat request acknowledgement codebook for the second set of candidate data transmission occasions.

16. The method of claim 15, wherein the first set of hybrid automatic repeat request acknowledgement timing values is used to determine the first set of candidate data transmission occasions.

17. The method of claim 15, wherein the plurality of hybrid automatic repeat request acknowledgement timing sets are configured in order, and an nth hybrid automatic repeat request acknowledgement timing set is a subset or a superset of an (n+1) th hybrid automatic repeat request acknowledgement timing set within the plurality of hybrid automatic repeat request acknowledgement timing sets.

18. A user equipment (UE), comprising:

at least one memory; and at least one processor coupled with the at least one memory and configured to cause the UE to:

receive, from a base station, first downlink control information scheduling a first data transmission in a first set of candidate data transmission occasions, wherein the first downlink control information:

indicates the user equipment to transmit hybrid automatic repeat request acknowledgement feedback for the first set of candidate data transmission occasions; and includes a first indicator indicating a first set of hybrid automatic repeat request acknowledgement timing values, wherein the first set of hybrid automatic repeat request acknowledgement timing values comprises a set of hybrid automatic repeat request acknowledgement timing values within a plurality of sets of hybrid automatic repeat request acknowledgement timing values, the plurality of sets of hybrid automatic repeat request acknowledgement timing values comprising a set of non-numerical, hybrid automatic repeat request acknowledgement timing values indicating hybrid automatic repeat request acknowledgement feedback transmission is to be suspended, the set of non-numerical, hybrid automatic repeat request acknowledgement timing values corresponding to a numerical indicator;

transmit, to the base station, a first hybrid automatic repeat request acknowledgement codebook for the first set of candidate data transmission occasions in response to channel access procedure for transmitting the first hybrid automatic repeat request acknowledgement codebook being successful;

receive, from the base station, second downlink control information scheduling a second data transmission in a second set of candidate data transmission occasions, wherein:

the second downlink control information indicates the user equipment to transmit hybrid automatic repeat request acknowledgement feedback for the second set of candidate data transmission occasions;

the second set of candidate data transmission occasions includes the first set of candidate data transmission occasions;

the second downlink control information includes a second indicator indicating a second set of hybrid automatic repeat request acknowledgement timing values; and the second set of hybrid automatic repeat request acknowledgement timing values includes the first set of hybrid automatic repeat request acknowledgement timing values; and transmit, to the base station, a second hybrid automatic repeat request acknowledgement codebook for the second set of candidate data transmission occasions in response to channel access procedure for transmitting the second hybrid automatic repeat request acknowledgement codebook being successful.

19. The UE of claim 18, wherein the first set of hybrid automatic repeat request acknowledgement timing values is used to determine the first set of candidate data transmission occasions.

20. The UE of claim 18, wherein the plurality of hybrid automatic repeat request acknowledgement timing sets are configured in order, and an nth hybrid automatic repeat request acknowledgement timing set is a subset or a superset of an (n+1) th hybrid automatic repeat request acknowledgement timing set within the plurality of hybrid automatic repeat request acknowledgement timing sets.

* * * * *